United States Patent
Berard

(10) Patent No.: US 7,272,491 B1
(45) Date of Patent: Sep. 18, 2007

(54) METHOD AND DEVICE FOR GENERATING A FLIGHT PLAN FOR A TACTICAL FLIGHT OF AN AIRCRAFT

(75) Inventor: Jérémy Berard, Fenouillet (FR)

(73) Assignee: Airbus France, Toulouse (FR)

( * ) Notice: Subject to any disclaimer, the term of this patent is extended or adjusted under 35 U.S.C. 154(b) by 633 days.

(21) Appl. No.: 10/883,803

(22) Filed: Jul. 6, 2004

(30) Foreign Application Priority Data

Jul. 7, 2003 (FR) .................................. 03 08270

(51) Int. Cl.
*G01C 21/00* (2006.01)
(52) U.S. Cl. ..................... 701/202; 701/14; 701/206
(58) Field of Classification Search .................. 701/3, 701/4, 10, 14, 201–204, 206; 244/180–183; 73/178 R
See application file for complete search history.

(56) References Cited

U.S. PATENT DOCUMENTS

| 4,413,316 | A | * | 11/1983 | Blue et al. ...................... 701/3 |
| 4,642,775 | A | * | 2/1987 | Cline et al. .................. 701/200 |
| 4,812,990 | A | * | 3/1989 | Adams et al. .................. 701/3 |
| 5,047,946 | A | * | 9/1991 | King et al. .................. 701/206 |
| 5,121,325 | A | | 6/1992 | DeJonge |
| 5,574,647 | A | | 11/1996 | Liden |
| 5,842,142 | A | * | 11/1998 | Murray et al. ................. 701/16 |
| 5,890,101 | A | | 3/1999 | Schaefer, Jr. et al. |
| 6,085,147 | A | * | 7/2000 | Myers ........................ 701/209 |
| 6,134,500 | A | | 10/2000 | Tang et al. |
| 6,173,159 | B1 | * | 1/2001 | Wright et al. .............. 455/66.1 |
| 6,816,780 | B2 | * | 11/2004 | Naimer et al. ............. 701/206 |
| 7,194,353 | B1 | * | 3/2007 | Baldwin et al. ............ 701/206 |

* cited by examiner

*Primary Examiner*—Gary Chin
(74) *Attorney, Agent, or Firm*—Stevens, Davis, Miller & Mosher, LLP

(57) ABSTRACT

A flight plan for a tactical flight of an aircraft is generated using first input data including initial weight and initial loading of the aircraft, meteorological data, points of transit of the flight plan and at least one optimization criterion. With the aid of the input data and by implementing a prediction function and an optimization function, a flight profile of the flight plan is determined. The profile includes for each point of transit of the flight plan, a plurality of predictive information items and, between two successive points of transit of the flight plan, optimized parameters. The flight plan is presented on a display screen. A second input allows an operator to enter, for each tactical event of the tactical flight, a variation of at least one parameter which is modified by this tactical event at a particular point of variation of the flight plan. The flight profile is determined using each parameter variation which is taken into account at the corresponding point of variation.

15 Claims, 3 Drawing Sheets

METHOD AND DEVICE FOR GENERATING A FLIGHT PLAN FOR A TACTICAL FLIGHT OF AN AIRCRAFT

FIELD OF THE INVENTION

The present invention relates to a method and device for generating a flight plan for a tactical flight of an aircraft.

BACKGROUND OF THE RELATED ART

Modern aircraft are furnished with a flight management system which provides a flight plan consisting of points of transit, connected together. At each point of transit, up to the destination airport, the flight management system provides predictions: time of transit, speed, altitude, fuel remaining on board. Moreover, the flight management system proposes an optimization of the flight plan: optimal cruising altitude, optimal speed for each phase of flight.

It is known that a civil flight plan followed for example by a civil transport airplane comprises a departure airport and a destination airport, plus possibly a diversion airport. In civil aviation, the load carried on board the aircraft (passengers, freight) does not vary in the course of one and the same flight. Moreover, the variations in the weight of fuel are due to the consumption of the engines and are therefore forecastable throughout the flight.

On the other hand, a tactical flight plan, that is to say a flight plan intended for a tactical flight, must take account of tactical events liable to modify the predictions. More precisely, for an aircraft involved in a tactical flight, four types of tactical events may cause the load transported to vary, or cause the quantity of fuel on board to vary (other than by the normal consumption of fuel), in the course of the flight:

- a decrease in the load transported, upon an aerial drop or an unloading during a tactical step which corresponds to a landing on an intermediate field for tactical purposes (standby, loading, unloading, etc.), followed by a takeoff toward the destination, or toward another tactical step;
- an increase in the load transported, upon loading during a tactical step;
- a decrease in the fuel on board (not due to the aircraft's own consumption), upon in-flight refueling in the guise of tanker aircraft; and
- an increase in the fuel on board, upon in-flight refueling in the guise of refueled aircraft.

The standard flight management systems take no account of these tactical events in the predictions of the flight plan before these events have actually occurred. Likewise, there is no optimization of the flight plan beyond the point at which a tactical event will take place, before this event has actually taken place.

When a tactical event has actually taken place, or has taken place partially (partial drop or refueling), the predictions are updated with the new parameters of the aircraft. Specifically, when the change has occurred, the aircraft weight parameters are modified by the crew so that the predictions are recalculated as a function of the current situation.

The standard flight management systems are therefore unable to produce a tactical flight plan, that is to say to produce during flight preparation a flight plan taking account of tactical events that will arise in the course of the flight.

SUMMARY OF THE INVENTION

An object of the present invention is to remedy these drawbacks. It relates to a method of generating a tactical flight plan for an aircraft.

Accordingly, according to the invention, said method according to which:

a) input data are defined comprising at least data of initial weight and initial loading of the aircraft, meteorological data, points of transit of the flight plan and at least one optimization criterion; and b) a flight profile of said flight plan comprising, for each point of transit of the flight plan, a plurality of predictive information and, between two successive points of transit of the flight plan, optimized parameters are determined, with the aid of said input data, by implementing a prediction function and an optimization function, is noteworthy in that:

α) tactical events of said tactical flight, to be taken into account, are selected;

β) for each tactical event thus selected, at least one parameter which is modified by this tactical event at a particular point of variation of the flight plan, as well as the variation of said parameter, corresponding to this modification, are determined; and δ) each parameter variation thus determined, taken into account at the corresponding point of variation, is used in step b) to determine said flight profile.

Thus, by virtue of the invention, a tactical flight plan is produced which takes account of tactical events of the aforesaid type, which will arise in the course of the tactical flight considered.

Advantageously, in step α):

α1) scheduled tactical events are defined; and

α2) out of all the scheduled tactical events thus defined, those which are to be taken into account are selected.

According to the invention:

said optimization criterion defines a ratio of the fuel consumption of the aircraft to the flight time; and/or said predictive information comprises, for each point of transit, at least the time of transit, the speed of transit, the altitude of transit and the weight of fuel remaining on board the aircraft; and/or said optimized parameters comprise at least the optimal speed and, as appropriate, the optimal cruising altitude, between two successive points of transit; and/or said tactical events comprise at least one of the following events: an in-flight drop, an in-flight refueling and a tactical step comprising a landing.

Advantageously, said parameter which is modified corresponds to one of the following parameters:

the weight of the load transported by the aircraft;

the weight of fuel on board the aircraft;

the empty weight of the aircraft;

the time of transit;

the position of the center of gravity of the aircraft; and the aerodynamic configuration of the aircraft.

In a preferred embodiment, said particular point of variation corresponds:

to the end of drop point, for a drop;

to the end of refueling point, for a refueling carried out by the aircraft in the guise of tanker;

to the start of refueling point, for a refueling carried out by the aircraft in the guise of refueled aircraft; and to the start point of the landing strip, for a tactical step.

Furthermore, advantageously, in step β), the following are determined as parameter variation:
- for a drop, the decrease in the weight of the load transported by the aircraft;
- for a refueling carried out by the aircraft in the guise of tanker, the decrease in the weight of fuel on board the aircraft;
- for a refueling carried out by the aircraft in the guise of refueled aircraft, the increase in the weight of fuel on board the aircraft; and
- for a tactical step, the possible variation of the weight of the load transported, the possible variation of the weight of fuel on board the aircraft and the stoppage time on the ground.

Within the context of the present invention, in step δ), direct use is made of the variation of said parameter or use is made of an estimated value of said parameter at the end of the corresponding tactical event, which takes account of said variation of said parameter.

The present invention also relates to a device for generating a flight plan for a tactical flight of an aircraft.

According to the invention, said device of the type comprising:
- first input means allowing an operator to enter input data comprising at least data of initial weight and initial loading of the aircraft, meteorological data, points of transit of the flight plan and at least one optimization criterion;
- a central unit for determining, with the aid of said input data, by implementing a prediction function and an optimization function, a flight profile of said flight plan comprising, for each point of transit of the flight plan, a plurality of predictive information and, between two successive points of transit of the flight plan, optimized parameters; are determined, and
- display means for presenting, on a display screen, the flight profile determined by said central unit, is noteworthy in that:
- said device comprises, furthermore, second input means allowing an operator to enter, for each tactical event of the tactical flight, the variation of at least one parameter which is modified by this tactical event at a particular point of variation of the flight plan; and
- said central unit uses, to determine said flight profile, each parameter variation which has been entered with the aid of said second input means and which is taken into account at the corresponding point of variation.

Moreover, in a particular embodiment:
- said device furthermore comprises at least one database containing parameter variations associated with tactical events;
- said second input means allow an operator to enter tactical events; and
- said central unit automatically uses the parameter variations contained in said database and associated with a particular tactical event, when the operator enters this tactical event with the aid of said second input means, to determine said flight profile.

BRIEF DESCRIPTION OF THE DRAWINGS

The figures of the appended drawing will elucidate the manner in which the invention may be embodied. In these figures, identical references designate similar elements.

DETAILED DESCRIPTION OF THE INVENTION

Figure 1:
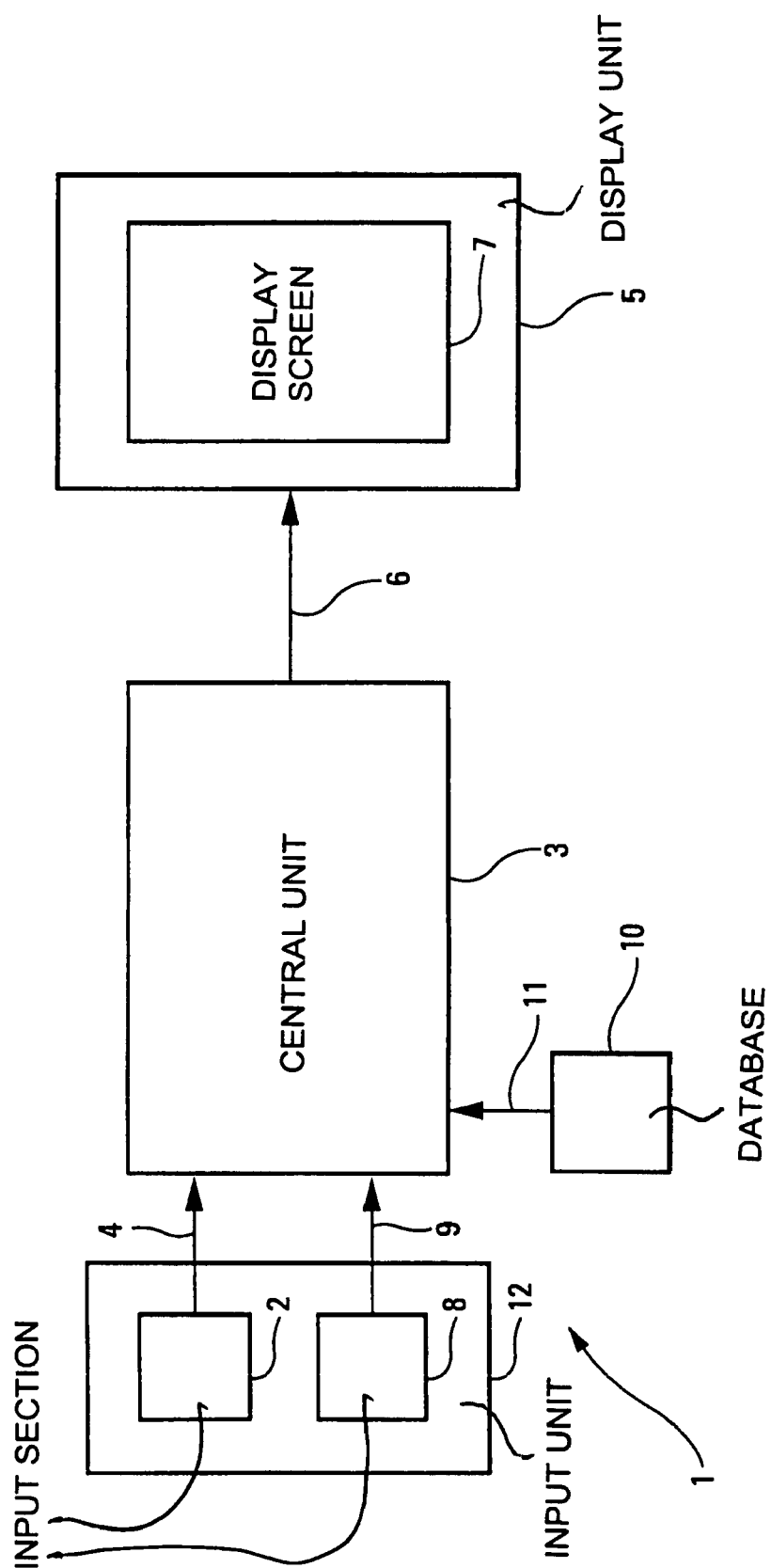
FIG. 1 is the schematic diagram of a device in accordance with the invention.

The device 1 in accordance with the invention and represented diagrammatically in FIG. 1 is intended for the generation of a flight plan for a tactical flight of an aircraft.

It is known that in the course of a tactical flight, various types of tactical events may cause the load transported to vary, or cause the quantity of fuel on board the aircraft to vary (other than through the normal consumption of fuel), in the course of the flight:
- a decrease in the load transported, upon an aerial drop or an unloading during a tactical step which corresponds to a landing on an intermediate field for tactical purposes (standby, loading, unloading, etc.), followed by a takeoff toward the destination, or toward another tactical step;
- an increase in the load transported, upon loading during a tactical step;
- a decrease in the fuel on board (not due to the aircraft's own consumption), upon in-flight refueling in the guise of tanker aircraft; and
- an increase in the fuel on board, upon in-flight refueling in the guise of refueled aircraft.

Figure 2:
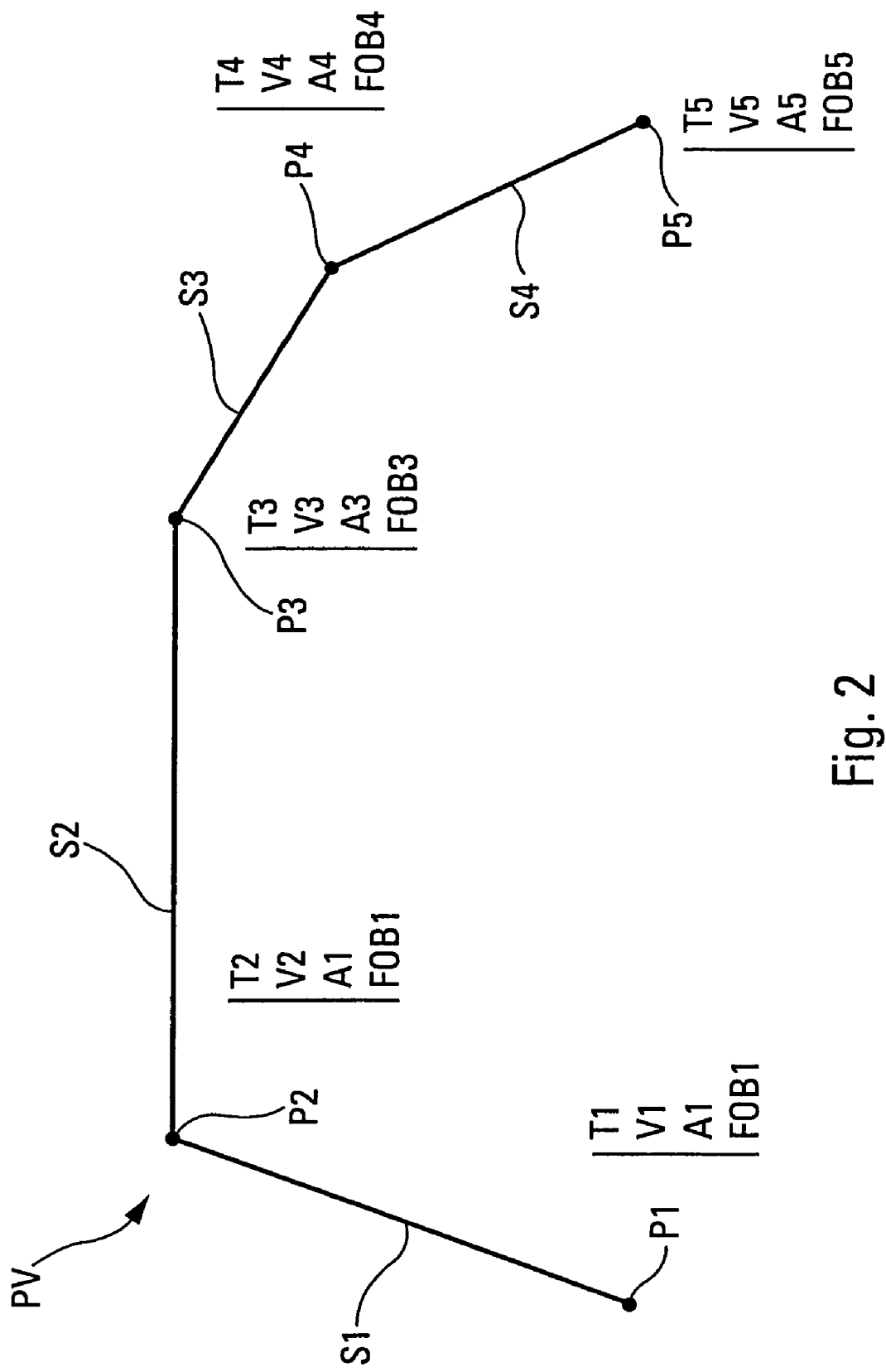
FIG. 2 diagrammatically illustrates a flight profile of a flight plan.

In a standard manner, a flight plan comprises, as illustrated in FIG. 2, for the flight profile PV (that is to say the representation in a vertical plane) of the flight plan, in particular:
- points of transit P1 to P5;
- information relating to said points of transit P1 to P5, such as the time of transit T1 to T5, the speed of transit V1 to V5, the altitude of transit A1 to A5, and the weight of fuel FOB1 to FOB5 remaining on board the aircraft; and
- segments S1 to S4 connecting said points of transit P1 to P5.

A tactical flight plan therefore corresponds to a flight plan which takes account of the tactical events of the aforesaid type, existing during a tactical flight (refueling, drop, tactical step).

Said device 1 is of the type comprising:
- input means 2 allowing an operator to enter input data comprising at least data of initial weight and initial loading of the aircraft, meteorological data, points of transit P1 to P5 of the flight plan and at least one optimization criterion;
- a central unit 3 which is connected by a link 4 to said input means 2, for determining, with the aid of said input data, by implementing a prediction function and an optimization function, a flight profile PV of said flight plan comprising, for each point of transit P1 to P5 of the flight plan, a plurality of predictive information P1 to P5 and, between two successive points of transit; of the flight plan, optimized parameters and
- display means 5 which are connected by a link 6 to said central unit 3, for presenting, on a display screen 7, the flight profile PV determined by said central unit 3.

According to the invention, in order to be able to produce a tactical flight plan of the aforesaid type:
- said device 1 comprises, furthermore, input means 8 which are connected by a link 9 to the central unit 3 and which allow an operator to enter, for each tactical event of the tactical flight taken into account, the variation ΔX of at least one parameter which is modified by this tactical event at a particular point of variation pi of the flight plan; and said central unit 3 uses, to determine said flight profile PV, each parameter X variation ΔX which has been entered with the aid of said input means 8 and takes it into account at the corresponding point of variation pi.

In a standard manner, the predictions implemented by the central unit 3 are based on the initial conditions specified by the crew, the geometry of the flight plan and performance models taking account of the characteristics of the aircraft (engines, aerodynamic characteristics, performance). The performance models, used for the predictions and also for the optimization, are derived from wind tunnel mockups and are corrected after in-flight trials. They reflect the performance of the engines, the aerodynamic characteristics of the aircraft and its own performance. These models are, for example, stored in a standard flight management system (not represented) which is connected to the central unit 3, in the form of performance tables, specific to each type of aircraft. These tables make it possible to determine, as a function of input parameters such as the weight of the aircraft, the altitude, etc. the parameters reflecting the performance of said aircraft, which make it possible to optimize the flight profile PV and to calculate predictions.

Furthermore, according to the invention:

said optimization criterion defines a ratio (chosen by the crew) of the fuel consumption of the aircraft to the corresponding flight time;

said predictive information comprises, for each point of transit P1 to P5, at least the time of transit T1 to T5, the speed of transit V1 to V5, the altitude of transit A1 to A5 and the weight of fuel FOB1 to FOB5 remaining on board the aircraft;

said optimized parameters comprise at least the optimal speed and, as appropriate, the optimal cruising altitude, over said segments S1 to S4, between two successive points of transit; and said possible tactical events of a tactical flight comprise at least one of the following events: an in-flight drop, an in-flight refueling and a tactical step comprising a landing.

The following abbreviations are used hereinafter.

| Abbreviations | Meanings |
| --- | --- |
| FOB ("Fuel On Board") | Weight of fuel on board the aircraft |
| ΔFOB | Variation of the weight of fuel on board the aircraft |
| FOBpi | Estimate of the weight of fuel on board the aircraft at the point pi |
| FOBpiF | Estimate of the weight of fuel on board the aircraft at the point pi, this estimate taking account of the tactical event scheduled at the point pi |
| ΔFOBpi | Variation of the weight of fuel on board the aircraft resulting from the tactical event at the point pi |
| GW ("Gross Weight") | Total weight of the aircraft |
| GWpi | Estimate of the total weight of the aircraft at the point pi |
| GWpiF | Estimate of the total weight of the aircraft at the point pi, this estimate taking account of the tactical event scheduled at the point pi |
| OWE ("Operational Weight Empty") | Empty weight of the aircraft |
| PW ("Payload Weight") | Weight of the load transported by the aircraft |
| ΔPW | Variation of the weight of the load transported by the aircraft |
| PWpi | Estimate of the weight of the load transported by the aircraft at the point pi |
| PWpiF | Estimate of the weight of the load transported by the aircraft at the point pi, this estimate taking account of the tactical event scheduled at the point pi |
| ΔPWpi | Variation of the weight of the load transported by the aircraft at the point pi resulting from the tactical event at the point pi |
| ΔT | Time spent on the ground by the aircraft |
| Tpi | Estimate of the time of transit at the point pi |
| TpF | Estimate of the time of transit at the point pi, this estimate taking account of the tactical event scheduled at the point pi |
| ΔTpi | Time spent on the ground by the aircraft during a tactical step at the point pi |
| X | Any parameter |
| Xpi | Estimate of the value of the parameter X at the point pi |
| XpiF | Estimate of the value of the parameter X at the point pi, this estimate taking account of the tactical event scheduled at the point pi |
| ΔXpi | Variation of the value of the parameter X at the point pi resulting from the tactical event at the point pi |
| ZFW ("Zero Fuel Weight") | Weight of the aircraft without fuel |
| ZFWpi | Estimate of the weight of the aircraft without fuel at the point pi |
| ZFWpiF | Estimate of the weight of the aircraft without fuel at the point pi, this estimate taking account of the tactical event scheduled at the point pi |

The device 1 allows the crew to specify, according to the scheduling of the aircraft's mission, as defined on departure or in flight:

for a drop, the decrease in the weight of the load transported ΔPW (<0), due to the drop (of airborne troops or of hardware);

for a refueling in the guise of tanker, the decrease in the weight of fuel on board ΔFOB (<0), due to the transfer of fuel to a refueled aircraft;

for a refueling in the guise of refueled aircraft, the increase in the weight of fuel on board ΔFOB (>0), due to the transfer of fuel from a tanker aircraft; and for a tactical step, the variation of the transported weight ΔPW (<0 or >0), due to the loading or to the unloading of troops or of hardware, the variation of the weight of fuel on board ΔFOB (<0 or >0), due to fuel-transfer operations on the ground, as well as the time which will be spent on the ground before taking off again ΔT (>0).

Several tactical events may be scheduled in the course of the flight. The crew therefore specifies the various parameters X to be taken into account for each of these tactical events.

Each tactical event is linked to a point of variation pi of the flight plan, for example:
- the end of drop point, for the drop;
- the end of refueling point, if the refueling is conducted by the aircraft in the guise of tanker aircraft. It is thus considered that the entirety of the fuel is kept on board the aircraft up to the end of the transfer of fuel, so preventing underestimation of the quantity of fuel on board for the duration of the refueling;
- the start of refueling point, if the refueling is performed by the aircraft in the guise of refueled aircraft. It is thus considered that the entirety of the fuel is received right from the start of refueling, thus preventing underestimation of the quantity of fuel on board for the duration of the refueling; and
- the start point of the landing strip, in the case of a tactical step.

It is thus considered, for the predictions, that the change takes place instantaneously at the point of variation pi considered.

It should be noted, in the case of a tanker aircraft, that a variation in weight of fuel may be manifested as:
- a variation in the weight of fuel usable by the aircraft for its own consumption, in the case where the fuel which is supplied to a refueled aircraft comes from the same tanks as those used by said tanker aircraft to feed its engines; or
- a simple variation of the load transported, in the case where the fuel which is supplied to a refueled aircraft is not usable by said tanker aircraft for its own consumption.

The latter case comes down to a decrease in the load transported, just as for a drop. In the subsequent description, a variation in weight of fuel in the case of a tanker aircraft will be regarded as corresponding to a variation of the weight of fuel which is consumable by this aircraft.

It will be noted furthermore that:
if we add the weight of the load transported PWpi which varies in the course of the flight for an aircraft involved in a tactical flight to the empty weight of the aircraft which is normally constant in the course of the flight OWE, we obtain the weight without fuel of the aircraft ZFWpi at the point pi:

$$ZFWpi = OWE + PWpi$$

if we add this weight without fuel ZFWpi to the weight of fuel on board FOBpi, we obtain the total weight GWpi of the aircraft at the point pi:

$$GWpi = ZFWpi + FOBpi$$

Various examples whereby the implementation of the present invention may be clearly illustrated will now be described:

A/ If within the context of a tactical flight, we consider a point of variation p1, at which a refueling is scheduled, we apply:

$$FOBp1F = FOBp1 + \Delta FOBp1$$

with FOBp1F, the prediction of the weight of fuel on board at p1, taking account of the refueling; and $$GWp1F = ZFWp1 + FOBp1F$$

with GWp1F, the prediction of the total weight of the aircraft at p1, taking account of the refueling.

Thus, by taking account of GWp1F and FOBp1F in the prediction calculations on the basis of the point p1, we take account of the variation of the weight of the load transported and the variation of the weight of fuel on board, that are due to the refueling at p1;

B/ If within the context of a tactical flight, we consider a point of variation p2, at which a drop is scheduled, we apply:

$$PWp2F = PWp2 + \Delta PWp2$$

with PWp2F, the prediction of the weight of the load transported at p2, taking account of the drop; and $$GWp2F = FOBp2 + OWE + PWp2F$$

with GWp2F, the prediction of the total weight of the aircraft at p2, taking account of the drop.

Thus, by taking account of GWp2F in the prediction calculations on the basis of the point p2, we take account of the variation of the weight of the load transported, due to the drop at p2;

C/ If within the context of a tactical flight, we consider a point of variation p3, at which a tactical step is scheduled, we apply:

$$PWp3F = PWp3 + \Delta PWp3$$

with PWp3F, the prediction of the weight of the load transported at p3, taking account of the loading or unloading;

$$FOBp3F = FOBp3 + \Delta FOBp3$$

with FOBp3F, the prediction of the weight of fuel on board at p3, taking account of the transfer of fuel;

$$GWp3F = FOBp3F + OWE + PWp3F$$

with GWp3F, the prediction of the total weight of the aircraft at p3, taking account of the loading (or unloading) and the transfer of fuel; and $$Tp3F = Tp3 + \Delta Tp3$$

with Tp3F, the prediction of the time of transit at p3 (planned departure time), taking account of the immobilization time at p3 due to the duration of the tactical step.

Thus, by taking account of GWp3F, FOBp3F and Tp3F in the calculations of the predictions on the basis of the point p3, we take account of the variation of the weight of the load transported, the variation of the weight of fuel on board, and the duration of immobilization at p3, which are due to the tactical step at p3.

It is possible to generalize the aforesaid principles in accordance with the invention. Specifically, if within the context of a tactical flight, we consider a point of variation pi, at which a tactical event is scheduled which causes the weight of the load transported and/or the weight of fuel on board to vary, and/or involves the immobilization of the aircraft for a certain duration at this point pi, we apply the following parameter or parameters corresponding to said tactical event:

$$PWpiF = PWpi + \Delta PWpi$$

with PWpiF, the prediction of the weight of the load transported at pi, taking account of the variation of the weight of the load transported ($\Delta PWpi$) at said point pi;

$$FOBpiF = FOBpi + \Delta FOBpi$$

with FOBpiF, the prediction of the weight of fuel on board at pi, taking account of the transfer of fuel ($\Delta FOBpi$) at said point pi;

$$GWpiF = FOBpiF + OWE + PWpiF$$

with GWpiF, the prediction of the total weight of the aircraft at pi, taking account of the variation of the weight of the load transported ($\Delta$PWpi) at said point pi and the transfer of fuel ($\Delta$FOBpi) at said point pi;

$$TpiF = Tpi + \Delta Tpi$$

with TpiF, the prediction of the time of transit at pi (time of departure from the point pi), taking account of the immobilization time at pi; and by generalizing, $XpiF = Xpi + \Delta Xpi$ with XpiF, the prediction of the value of any parameter X at pi, taking account of the scheduled variation of this parameter at pi.

Thus, by taking account of GWpiF, FOBpiF, TpiF, and XpiF in the calculations of the predictions on the basis of the point pi, we take account of the variation of the weight of the load transported, the variation of the weight of fuel on board, the duration of immobilization at pi, and any other variation of any parameter X, that are due to the tactical event scheduled at said point pi.

According to the invention, said parameter X may be the center of gravity of the aircraft, in the use of the device 1 where the predictions are calculated by taking account of the variations of the center of gravity.

Said parameter X may also represent the empty weight of the aircraft (OWE), in the case of an aircraft which drops elements in flight in a scheduled manner (weapons, additional tanks, etc.), these elements initially forming part of the aircraft without the loading thereof and without its fuel. In the latter case, the use of the invention can be extended to take account of the variations of aerodynamic drag of the aircraft, that are due to the disappearance of these external elements, by considering an implementation of the invention involving a drag factor, which makes it possible to tailor the result of the prediction calculations as a function of the aerodynamic configuration of the aircraft. By virtue of the invention, the variation of the drag factor may be taken into account right from the scheduling of the flight. The same holds for the variation of the center of gravity of the aircraft.

According to the invention, whatever the parameter X, an operator can with the aid of the means 8, either directly enter the variation $\Delta$Xpi of this parameter X at pi, or enter the value XpiF of said parameter X after variation at pi. The two embodiments are equivalent, since $\Delta$Xpi and XpiF are linked by the following relation:

$$XpiF = Xpi + \Delta Xpi.$$

Additionally, in a particular embodiment:
said device 1 moreover comprises at least one database 10 connected by a link 11 to the central unit 3 and containing parameter variations $\Delta$X associated with tactical events;
said input means 8 are formed in such a way as to allow an operator to enter tactical events; and
said central unit 3 automatically uses (to determine the flight profile PV) the parameter variations $\Delta$X contained in said database 10 and associated with a particular tactical event, when the operator enters this tactical event with the aid of said input means 8.

The input means 2 and 8 may be grouped together into a single input unit 12. This input unit 12 may, for example, cooperate with the display means 5 to form an interface.

Figure 3:
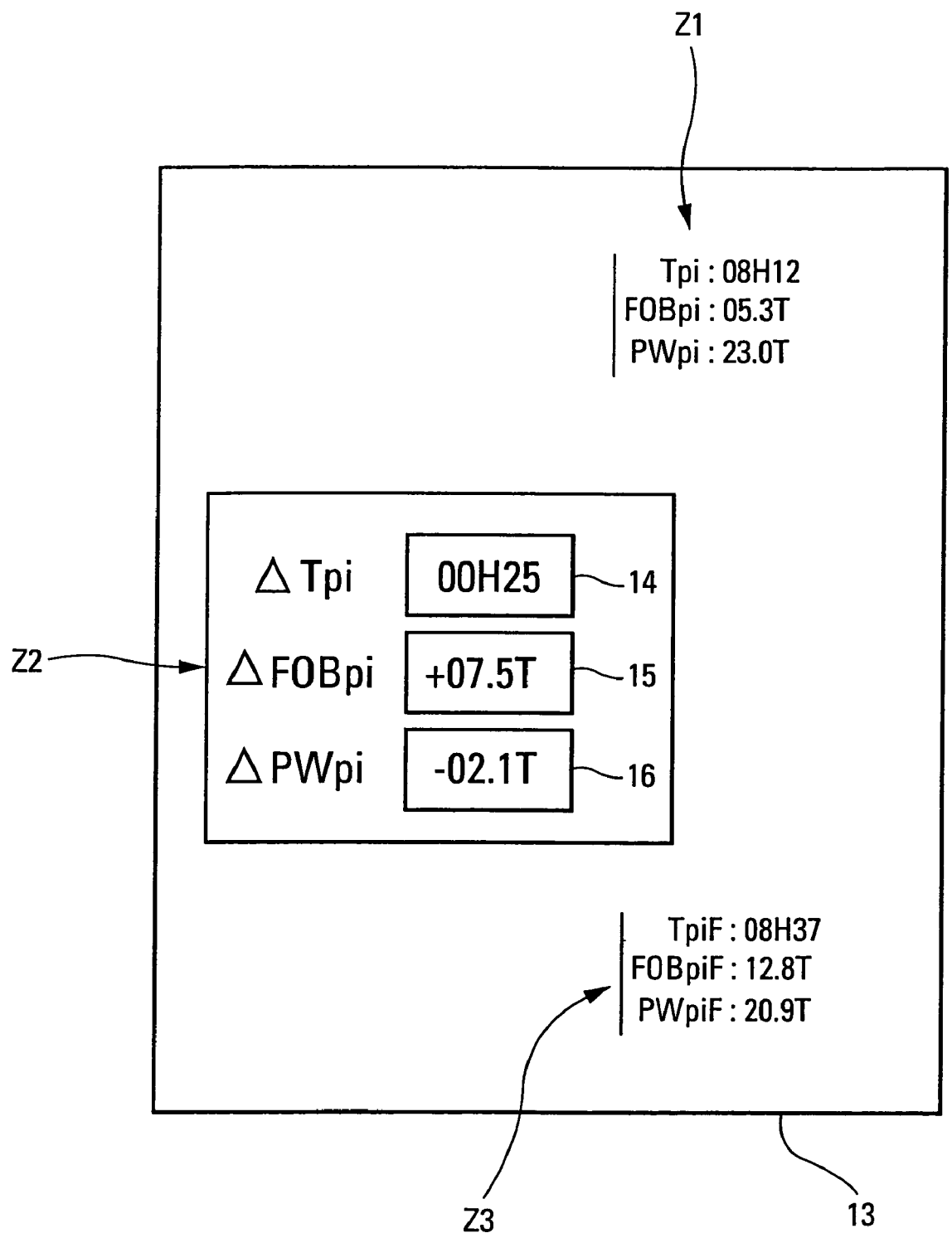
FIG. 3 diagrammatically shows a page that may be presented to an operator and that allows the present invention to be clearly explained.

In a particular embodiment, to allow an operator to enter parameter variations or at the very least to facilitate such input, the device 1 can display, for example on the display screen 7 or another specific screen, a page such as the page 13 represented in FIG. 3.

This page 13 comprises three zones Z1, Z2 and Z3:
a zone Z1, in which the device 1 automatically displays predictive parameters for a point pi of the flight plan PV, for example the parameters Tpi (equal to 08H32 in the example at FIG. 3), FOBpi (05.3 tonnes [T]) and PWpi (23.0 tonnes);
a zone Z2, allowing an operator to enter variations of particular parameters into specific boxes 14, 15 and 16, in particular the parameter variations $\Delta$Tpi (00H25), $\Delta$FOBpi (+07.5 tonnes) and $\Delta$PWpi (−02.1 tonnes); and
a zone Z3, in which the device 1 automatically displays the new parameters TpiF (08H37), FOBpiF (12.8 tonnes) and PWpiF (20.9 tonnes) taken into account by the central unit 3 to compile the tactical flight plan.

The display is of course suitable for the tactical event considered at said point pi. Thus, by way of example, for a drop, only the box 16 ($\Delta$PWpi) is displayed and accessible to an operator in order to enter the appropriate value.

The device 1 additionally makes it possible for the optimization of the speeds for each phase of flight (segments S1 to S4) and the optimization of the cruising altitude to be adapted to the case of tactical flight. The tactical phases (refueling, drop, tactical step) are conducted at prescribed speed and at prescribed altitude. These phases of flight are therefore not themselves subjected to speed and altitude optimization. However, these flight phases are preceded by (and followed by) conventional phases (climb, cruising, descent), to which the optimization calculations apply. If the following succession is considered: takeoff, climb, cruising phase 1, . . . , tactical phase, . . . , cruising phase 2, . . . , it is possible to calculate the optimal altitude for cruising phase 1 based on the weight predicted at the start of cruising phase 1, and the optimal altitude for cruising phase 2 based on the weight predicted at the start of cruising phase 2, this latter predicted weight taking account of the tactical event arising during the tactical phase, by virtue of the aforesaid characteristics in accordance with the invention. The same principle is applied for the calculation of the optimal speeds, before and after a tactical phase.

For strategic reasons, the crew can choose to consider only certain tactical events so as to take them into account in the calculation of the predictions. To do this:
they define the scheduled tactical events; and
they select, from among all the scheduled tactical events thus defined, those which are to be taken into account.

Typically, for a mission in the course of which an aircraft must be refueled, the crew can choose not to take account of the refueling, so as to consider the case where this refueling cannot take place. Thus, they choose not to risk overestimating the quantity of fuel on board, beyond the refueling point. However, in the case where this refueling is not taken into account, the predictions will be optimistic from the point of view of the total weight (hence from the point of view of the performance of the aircraft) after the refueling point. Another case is that of the drop: the most penalizing case, in respect of the predicted total weight (and hence in respect of performance), is that where the drop does not take place, the weight without fuel of the aircraft remaining identical after the event.

It is therefore possible to allow the crew to display the predictions, while adopting an unfavorable strategy in terms of performance or in terms of predictions of on-board fuel. The crew can also adopt intermediate assumptions, individually selecting the events to be taken into account. It is also possible to envisage a strategy defined by default, modifiable or otherwise by the crew. It is also possible to envisage the predictions of fuel and the predictions of total weight (and consequently the performance of the aircraft) being based on different assumptions.

The device 1 in accordance with the invention therefore allows an operator:

to take account of the tactical events of a tactical flight for the predictions and the optimization of the flight plan, right from the preparation of the flight, before these events occur; and to select from among these events those which must be taken into account, as a function of the strategy chosen to calculate the predictions, and to allow the crew to envisage all cases (depending on whether it is considered that an event will or will not take place in the course of the flight).

The invention claimed is:

1. A method of generating a flight plan for a tactical flight of an aircraft, said method comprising:

a) defining input data comprising at least data of initial weight and initial loading of the aircraft, meteorological data, points of transit of the flight plan and at least one optimization criterion; and b) determining, with the aid of said input data, by implementing a prediction function and an optimization function, (i) a flight profile of said flight plan comprising, for each point of transit of the flight plan, a plurality of predictive information and (ii) between two successive points of transit of the flight plan, optimized parameters, wherein:

α) tactical events of said tactical flight, to be taken into account, are selected;

β) for each tactical event thus selected, at least one parameter which is modified by said tactical event at a particular point of variation of the flight plan, as well as the variation of said parameter, corresponding to said modification, are determined; and δ) each parameter variation thus determined, taken into account at the corresponding point of variation, is used in step b) to determine said flight profile.

2. The method as claimed in claim 1, wherein in step α):

α1) scheduled tactical events are defined; and

α2) out of all the scheduled tactical events thus defined, those which are to be taken into account are selected.

3. The method as claimed in claim 1, wherein said optimization criterion defines a ratio of the fuel consumption of the aircraft to the flight time.

4. The method as claimed in claim 1, wherein said predictive information comprises, for each point of transit, at least the time of transit, the speed of transit, the altitude of transit and the weight of fuel remaining on board the aircraft.

5. The method as claimed in claim 1, wherein said optimized parameters comprise at least the optimal speed and, as appropriate, the optimal cruising altitude, between two successive points of transit.

6. The method as claimed in claim 1, wherein said tactical events comprise at least one of the following events: an in-flight drop, an in-flight refueling and a tactical step comprising a landing.

7. The method as claimed in claim 1, wherein said at least one parameter which is modified corresponds to one of the following parameters:

the weight of the load transported by the aircraft;
   the weight of fuel on board the aircraft;
   the empty weight of the aircraft;
   the time of transit; and
   the position of the center of gravity of the aircraft; and the aerodynamic configuration of the aircraft.

8. The method as claimed in claim 1, wherein said particular point of variation corresponds:

to the end of drop point, for a drop;
   to the end of refueling point, for a refueling carried out by the aircraft in the guise of tanker;
   to the start of refueling point, for a refueling carried out by the aircraft in the guise of refueled aircraft; and
   to the start point of the landing strip, for a tactical step.

9. The method as claimed in claim 1, wherein in step β), the following are determined as parameter variation:

for a drop, the decrease in the weight of the load transported by the aircraft;
   for a refueling carried out by the aircraft in the guise of tanker, the decrease in the weight of fuel on board the aircraft;
   for a refueling carried out by the aircraft in the guise of refueled aircraft, the increase in the weight of fuel on board the aircraft; and
   for a tactical step, the possible variation of the weight of the load transported, the possible variation of the weight of fuel on board the aircraft and the stoppage time on the ground.

10. The method as claimed in claim 1, wherein in step δ), for at least one parameter, direct use is made of the variation of said parameter.

11. The method as claimed in claim 1, wherein in step δ), for at least one parameter, use is made of an estimated value of said at least one parameter, at the end of a tactical event corresponding thereto, which takes account of the variation of said at least one parameter.

12. A device for generating a flight plan for a tactical flight of an aircraft, said device comprising:

a first input section for allowing an operator to enter input data comprising at least data of initial weight and initial loading of the aircraft, meteorological data, points of transit of the flight plan and at least one optimization criterion;

a central unit for determining, with the aid of said input data, by implementing a prediction function and an optimization function, a flight profile of said flight plan comprising, for each point of transit of the flight plan, a plurality of predictive information and, between two successive points of transit of the flight plan, optimized parameters; and a display section for presenting, on a display screen, the flight profile determined by said central unit, wherein:

said device further comprises a second input section for allowing said operator to enter, for each tactical event of the tactical flight, the variation of at least one parameter which is modified by said tactical event at a particular point of variation of the flight plan; and said central unit uses, to determine said flight profile, each parameter variation which has been entered with the aid of said second input section and which is taken into account at the corresponding point of variation.

13. The device as claimed in claim 12, wherein:

said device furthermore comprises at least one database containing parameter variations associated with tactical events;

said second input section allow said operator to enter tactical events; and said central unit automatically uses the parameter variations contained in said database and associated with a particular tactical event, when the operator enters said tactical event with the aid of said second input section, to determine said flight profile.

14. An aircraft, which comprises a device (1) comprising:
a) a data defining section which defines input data comprising at least data of initial weight and initial loading of the aircraft, meteorological data, points of transit (P1 to P5) of the flight plan and at least one optimization criterion;
b) a determining section that determines, with the aid of said input data, by implementing a prediction function and an optimization function, (i) a flight profile of said flight plan (PV) comprising, for each point of transit (P1 to P5) of the flight plan, a plurality of predictive information (T1 to T5, V1 to V5, A1 to A5, FOB1 to FOB5) and (ii) between two successive points of transit of the flight plan, optimized parameters;
c) a selection section that selects tactical events of said tactical flight, to be taken into account; and
d) an input section that determines, for each tactical event thus selected, at least one parameter which is modified by said tactical event at a particular point of variation of the flight plan, as well as the variation of said parameter, corresponding to said modification, wherein:
said determining section determines said flight profile by employing each parameter variation thus determined, taken into account at the corresponding point of variation.

15. An aircraft, which comprises a device, said device comprising:
a first input section allowing an operator to enter input data comprising at least data of initial weight and initial loading of the aircraft, meteorological data, points of transit of the flight plan and at least one optimization criterion;
a central unit for determining, with the aid of said input data, by implementing a prediction function and an optimization function, a flight profile of said flight plan comprising, for each point of transit of the flight plan, a plurality of predictive information and, between two successive points of transit of the flight plan, optimized parameters; and
a display section for presenting, on a display screen, the flight profile determined by said central unit, wherein:
said device further comprises a second input section allowing said operator to enter, for each tactical event of the tactical flight, the variation of at least one parameter which is modified by said tactical event at a particular point of variation of the flight plan; and
said central unit uses, to determine said flight profile, each parameter variation which has been entered with the aid of said second input section and which is taken into account at the corresponding point of variation.

* * * * *